United States Patent
Shimomura

(10) Patent No.: US 9,162,476 B2
(45) Date of Patent: Oct. 20, 2015

(54) INKJET PRINTER

(71) Applicant: RISO KAGAKU CORPORATION, Tokyo (JP)

(72) Inventor: Kenji Shimomura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/489,691

(22) Filed: Sep. 18, 2014

(65) Prior Publication Data

US 2015/0091964 A1 Apr. 2, 2015

(30) Foreign Application Priority Data

Sep. 30, 2013 (JP) ................................. 2013-203719

(51) Int. Cl.
| | |
|---|---|
| *B41J 2/205* | (2006.01) |
| *B41J 2/21* | (2006.01) |
| *B41J 2/14* | (2006.01) |
| *B41J 3/01* | (2006.01) |
| *G06K 15/10* | (2006.01) |

(52) U.S. Cl.
CPC .............. *B41J 2/2132* (2013.01); *B41J 2/1433* (2013.01); *B41J 3/01* (2013.01); *G06K 15/102* (2013.01)

(58) Field of Classification Search
CPC ...................................................... B41J 11/009
See application file for complete search history.

(56) References Cited

U.S. PATENT DOCUMENTS

| | | | | |
|---|---|---|---|---|
| 4,325,085 A | * | 4/1982 | Gooch | 382/234 |
| 5,751,310 A | * | 5/1998 | Yano et al. | 347/43 |
| 2005/0219329 A1 | * | 10/2005 | Sanada | 347/70 |
| 2006/0203019 A1 | * | 9/2006 | Yamanobe | 347/12 |
| 2007/0109583 A1 | * | 5/2007 | Yoneoka | 358/1.13 |
| 2009/0128838 A1 | * | 5/2009 | Yamamoto | 358/1.9 |

FOREIGN PATENT DOCUMENTS

| | | |
|---|---|---|
| JP | 2003237059 A | 8/2003 |
| JP | 2004291401 A * | 10/2004 |

* cited by examiner

*Primary Examiner* — Shelby Fidler
*Assistant Examiner* — Tracey McMillion
(74) *Attorney, Agent, or Firm* — Greenblum & Bernstein P.L.C.

(57) ABSTRACT

Upon determination that a paper to be printed is a first type of paper, a controller deletes pixels at least in one line from one side end of a pattern image forming a black information code in an information recording direction, and drives a printing unit to eject an ink of at least one color other than black in addition to an ink of black to pixels at least in one line at each of two side ends in the information recording direction of the pattern image with the pixels at least in the one line being deleted such that the pattern image is printed with a same width in the information recording direction as a width of the black information code included in an image data.

6 Claims, 8 Drawing Sheets

| PAPER TYPE | NUMBER OF DROPS | |
|---|---|---|
| | BLACK | CYAN |
| PLAIN PAPER A | 5 | 5 |
| PLAIN PAPER B | 5 | 3 |
| ... | ... | ... |

INKJET PRINTER

CROSS REFERENCE TO RELATED APPLICATION

This application is based upon and claims the benefit of priority from the prior Japanese Patent Application No. 2013-203719, filed on Sep. 30, 2013, the entire contents of which are incorporated herein by reference.

BACKGROUND

1. Technical Field

The disclosure relates to an inkjet printer configured to perform printing by ejecting ink onto a print medium.

2. Related Art

There have been known information codes such as two-dimensional codes typified by a barcode and a QR code (registered trademark). For printing images of such information codes on paper or the like, on-demand printing has attracted attention from the viewpoint of small lot production of a wide variety of products. Above all, a line inkjet printer which allows easy speed-up of printing speed is expected to perform printing of information codes.

Here, a barcode, for example, specifies information by using a pattern of bars (black lines) and spaces (white lines). Meanwhile, since an inkjet printer forms dots by permeation of ink into paper, bars printed as a barcode by the inkjet printer are likely to be thick by ink bleed. This may result in reduction in reading accuracy for barcodes printed by the inkjet printer. Likewise, also for other types of information codes printed by the inkjet printer, reduction in reading accuracy due to ink bleed may occur.

To address this, it has been known to reduce an amount of ink ejected per dot in printing of an information code by an inkjet printer. Japanese Unexamined Patent Application Publication No. 2003-237059 describes a technique in which an ink ejection amount for dots in the outer edge portion of each print region in an image that forms an information code is set to an amount smaller than an ink ejection amount for the other dots in an inkjet printer.

By reducing the ink ejection amount at least for the outer edge portion of the dots that form the image of the information code and thus reducing the size of the dots as described above, thickening of bars in a barcode, for example, is suppressed.

SUMMARY

In this connection, when dots are reduced in size, spaces may be generated between the dots to reduce the image density.

For example, reduction in the densities of bars in a barcode decreases the contrast between the bars and spaces. As a result, reading accuracy may be deteriorated.

It is an object of the present invention to provide an inkjet printer capable of printing an information code so as to reduce deterioration in reading accuracy.

An inkjet printer in accordance with some embodiments includes: a printing unit including a black nozzle array having a plurality of nozzles to eject an ink of black and at least one other nozzle array having a plurality of nozzles to eject an ink of color other than black, the printing unit being configured to eject the inks onto paper from the plurality of nozzles in the black nozzle array and the other nozzle array while transferring the paper; and a controller configured to drive the printing unit to perform printing on the paper based on image data. The printing unit is capable of performing printing on a first type of paper having a first degree of ink bleed and on a second type of paper having a second degree of ink bleed larger than the first degree of ink bleed The controller is configured to determine whether the image data includes a black information code, upon determination that the image data includes the black information code, determine whether a paper to be printed is the first type of paper, and upon determination that the paper to be printed is the first type of paper, delete pixels at least in one line from one side end of a pattern image forming the black information code in an information recording direction, and drive the printing unit to eject the ink of at least one color other than black in addition to the ink of black to pixels at least in one line at each of two side ends in the information recording direction of the pattern image with the pixels at least in the one line being deleted such that the pattern image is printed with a same width in the information recording direction as a width of the black information code included in the image data.

According to the above configuration, by deleting pixels at least in one line from one side end of the pattern image in the information recording direction, thickening of the pattern image to be printed can be suppressed. Also, an increase in the size of dots using another ink in addition to the black ink covers for a part of the width reduced by pixel deletion. Thus, the width of the pattern image in the information recording direction can be set to be a specified width, i.e., a width of a black information code included in the image data. Therefore, the information code can be printed so as to reduce deterioration in reading accuracy.

The controller may be configured to determine a maximum number of drops to be ejected per pixel from the plurality of nozzles for each type of paper to be printed, and determine a transfer speed for each type of paper based on the determined maximum number of drops, and upon printing of the black information code included in the image data on the first type of paper, set a number of drops of the ink of black per pixel in the pattern image to be the maximum number of drops, and determine a number of drops per pixel of the ink of at least the one color other than black to be ejected in addition to the ink of black from among numbers less than or equal to the maximum number of drops according to the type of the paper.

According to the above configuration, the pattern image can be printed with the specified width and high density without lowering the transfer speed according to the type of paper. Thus, the information code can be printed so as to reduce deterioration in reading accuracy without lowering productivity of printed material.

The first degree of ink bleed of the first type of paper may be larger than a degree of ink bleed of matte paper.

According to the above configuration, the information code can be printed so as to reduce deterioration in reading accuracy for plain paper or the like, which has a relatively large degree of ink bleed, rather than matte paper or the like, which is not prone to ink bleed.

The maximum number of drops may be determined to be smaller as a type of paper has a larger degree of ink bleed.

According to the above configuration, the information code can be printed so as to reduce deterioration in reading accuracy.

DETAILED DESCRIPTION

Figure 1:
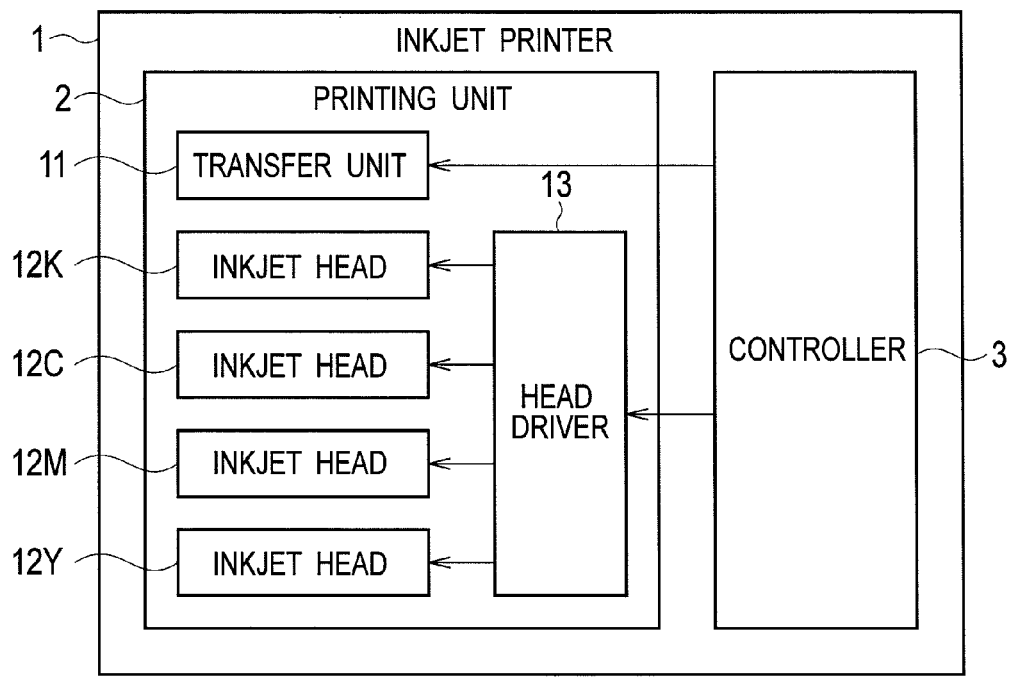
FIG. 1 is a block diagram showing a configuration of an inkjet printer according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
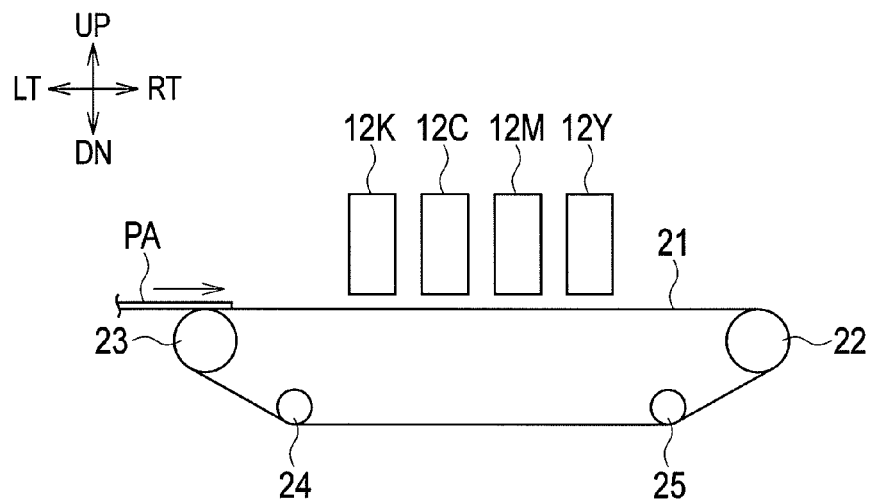
FIG. 2 is a schematic configuration diagram of a printing unit.
Figures 3, 4:
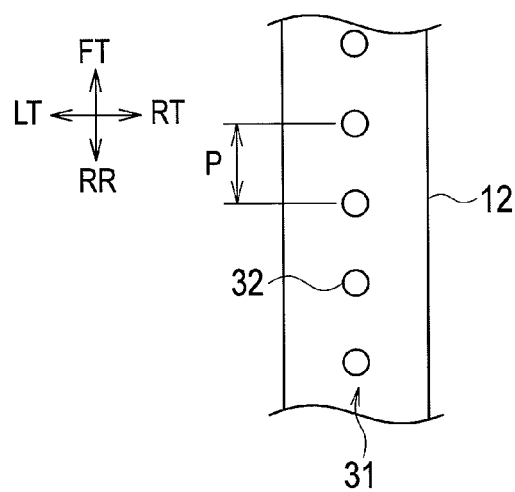
FIG. 3 is an explanatory diagram of a nozzle array.
FIG. 4 is a table for thinning-out printing.

FIG. 1 is a block diagram showing a configuration of an inkjet printer according to an embodiment of the present invention. FIG. 2 is a schematic configuration diagram of a printing unit in the inkjet printer shown in FIG. 1. FIG. 3 is an explanatory diagram of a nozzle array. In the following description, it is assumed that a direction perpendicular to the page in FIG. 2 is a front-rear direction of the inkjet printer and a page front direction is the front. It is also assumed that top, bottom, left and right of the page in FIG. 2 are top, bottom, left and right directions of the inkjet printer. In FIG. 2, a left-to-right direction is a transfer direction of paper PA. In the drawings, rightward, leftward, upward, downward, forward and backward are indicated by RT, LT, UP, DN, FT and RR, respectively. Also, in the drawings, a longitudinal direction and a lateral direction (width direction) of a barcode 50 are indicated by LD and WD, respectively.

As shown in FIG. 1, an inkjet printer 1 according to this embodiment includes a printing unit 2 and a controller 3.

The printing unit 2 performs printing by ejecting ink onto the paper PA while transferring the paper PA. The printing unit 2 includes a transfer unit 11, inkjet heads 12K, 12C, 12M and 12Y, and a head driver 13.

The transfer unit 11 transfers the paper PA. An unillustrated paper feeder feeds the paper PA to the transfer unit 11. The paper feeder can hold various kinds of paper. As shown in FIG. 2, the transfer unit 11 includes a transfer belt 21, a drive roller 22 and driven rollers 23, 24 and 25.

The transfer belt 21 transfers the paper PA while adsorbing and holding the paper PA. The transfer belt 21 is a looped belt stretched around the drive roller 22 and the driven rollers 23 to 25. In the transfer belt 21, a number of belt holes are formed.

The transfer belt 21 uses adsorption force generated in the belt holes by driving a fan (not shown) to adsorb and hold the paper PA on its upper surface. The transfer belt 21 is rotated in a clockwise direction in FIG. 2 to transfer the adsorbed and held paper PA from left to right.

The drive roller 22 rotates the transfer belt 21. The drive roller 22 is driven by an unillustrated motor.

The driven rollers 23 to 25 follow the drive roller 22 through the transfer belt 21. The driven roller 23 is disposed to the left side of the drive roller 22 at approximately the same height as the drive roller 22. The driven rollers 24 and 25 are disposed at approximately the same height with a space therebetween in the horizontal direction below the drive roller 22 and the driven roller 23.

The inkjet heads 12K, 12C, 12M and 12Y eject ink onto the paper PA transferred by the transfer unit 11.

The inkjet heads 12K, 12C, 12M and 12Y eject black (K), cyan (C), magenta (M) and yellow (Y) inks, respectively. The inkjet heads 12K, 12C, 12M and 12Y are disposed in parallel in the horizontal direction above the transfer unit 11. Note that the inkjet heads 12K, 12C, 12M and 12Y may be collectively described by omitting the additional alphabetical characters (K, C, M and Y) in the reference numerals thereof.

As shown in FIG. 3, each of the inkjet heads 12 has a nozzle array 31. The nozzle array 31 includes a number of nozzles 32. The nozzle array 31 of the inkjet head 12K is a black nozzle array. The nozzle arrays 31 of the inkjet heads 12C, 12M and 12Y are other nozzle arrays, i.e., a cyan nozzle array, a magenta nozzle array and a yellow nozzle array.

The nozzles 32 eject ink. The inkjet head 12 performs multi-drop printing capable of changing the number of ink droplets (the number of drops) to be ejected to one pixel from one of the nozzles 32. The nozzles 32 have openings on a lower surface of the inkjet head 12. The nozzles 32 are equally spaced apart with a predetermined pitch P along the front-rear direction (main scanning direction) perpendicular to the transfer direction (sub-scanning direction) of the paper PA.

The head driver 13 drives the inkjet heads 12K, 12C, 12M and 12Y to eject ink from the nozzles 32.

The controller 3 controls operations of all the units in the inkjet printer 1. The controller 3 includes a CPU, a RAM, a ROM, a hard disk and the like.

In printing, the controller 3 sets the maximum number of drops according to the type of paper to be used for printing. The maximum number of drops is the maximum number of ink drops to be ejected per pixel from the nozzles 32. The maximum number of drops is determined in consideration of a degree of ink bleed for each type of paper. The maximum number of drops is set small for the type of paper having a large degree of ink bleed.

In printing, the controller 3 also sets a transfer speed of the paper PA transferred by the transfer unit 11 based on the maximum number of drops. The higher the transfer speed, the more difficult it is to allow many droplets to land on the same position on the paper PA from one of the nozzles 32. Therefore, the transfer speed of the paper PA is set low if the maximum number of drops is large. A higher transfer speed, i.e., a smaller maximum number of drops will bring higher productivity of the printed material.

In printing a black barcode in image data on a predetermined type of paper, the controller 3 performs thinning-out printing for the barcode. The thinning-out printing is to reduce thickening of bars in the barcode due to ink bleed. To be more specific, the controller 3 deletes pixels in one line at one side end in a width direction (lateral direction) of each of the bars to form the barcode. This is to suppress thickening of the bar. Then, the controller 3 controls the printing unit 2 such that the cyan ink is ejected in addition to the black ink to the pixels in each bar after deletion of the pixels and thus the bar to be printed has a specified width. Here, the specified width is a width in the width direction (lateral direction) of each of the bars to form a black barcode included in image data (i.e., a width of each bar in the image data). The specified width includes a tolerance.

The controller 3 stores a thinning-out printing table 41 shown in FIG. 4. The thinning-out printing table 41 is a table showing, for each type of paper, the number of drops of black and cyan inks to be ejected to each of the pixels in each bar after pixel deletion during thinning-out printing.

The number of black drops in the thinning-out printing table 41 is the maximum number of drops corresponding to the type of paper. The number of cyan drops in the thinning-out printing table 41 is the number of drops set such that the width of the bar is set to be a specified width by ejecting in addition to the maximum number of black ink drops to the pixels in the bar after pixel deletion. The number of cyan drops in the thinning-out printing table 41 is not more than the maximum number of drops. The number of cyan drops as described above is experimentally obtained, for example. Note that the specified width includes a tolerance as described above.

As described above, the thinning-out printing for the barcode is to reduce the thickening of bars in the barcode due to ink bleed. Therefore, the type of paper to be subjected to thinning-out printing is plain paper or the like, which has a relatively large degree of ink bleed. Therefore, matte paper or the like, which is not prone to ink bleed, is not to be subjected to thinning-out printing.

Figure 5:
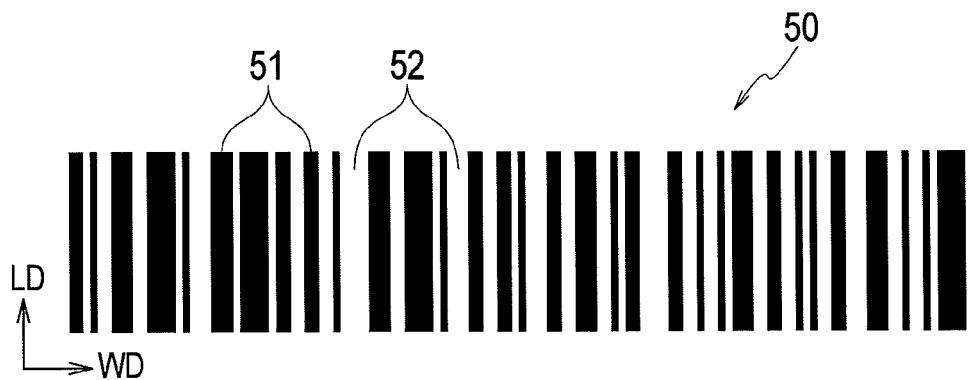
FIG. 5 is a diagram showing an example of a barcode.

Here, FIG. 5 shows an example of a barcode that is an information code. As shown in FIG. 5, a barcode 50 has a number of longitudinally long rectangular bars (pattern images) 51. The bars 51 are disposed in parallel in the lateral direction (width direction). Spaces 52 are formed between the bars 51. Information is expressed by widths of the bars 51 and spaces 52. In other words, information is recorded in the lateral direction in the barcode. In the barcode, the lateral direction (the width direction of the bar) corresponds to an information recording direction.

Next, operations of the inkjet printer 1 are described.

Figure 6:
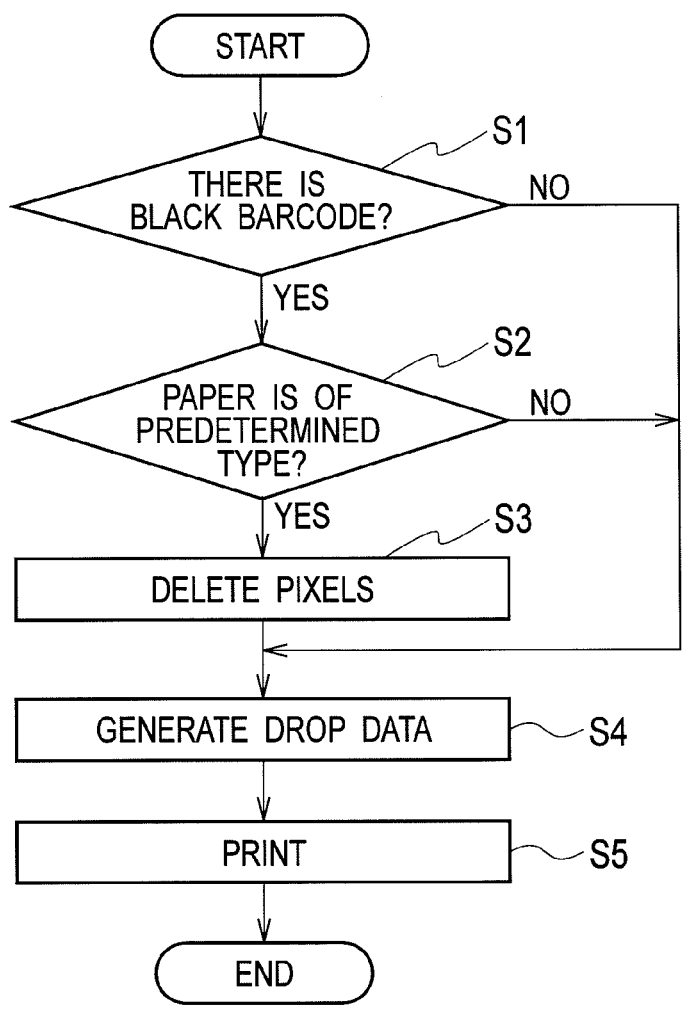
FIG. 6 is a flowchart for explaining operations of the inkjet printer.

FIG. 6 is a flowchart for explaining the operations of the inkjet printer 1. The processing shown in the flowchart of FIG. 6 is started when print data is inputted to the inkjet printer 1 from an external terminal and the print data is developed into an image by the controller 3 to generate RGB format image data.

In Step S1 of FIG. 6, the controller 3 determines whether or not there is a black barcode in the image data.

When it is determined that there is a black barcode in the image data (Step S1: YES), the controller 3 determines in Step S2 whether or not paper to be used for printing is a predetermined type of paper to be subjected to thinning-out printing. The controller 3 can determine the type of paper to be used for printing from paper information included in the print data.

When it is determined that the paper to be used for printing is the predetermined type of paper (Step S2: YES), the controller 3 deletes pixels in one line from one side end in a width direction (lateral direction) of each of bars to form a barcode in Step S3.

Figure 7:
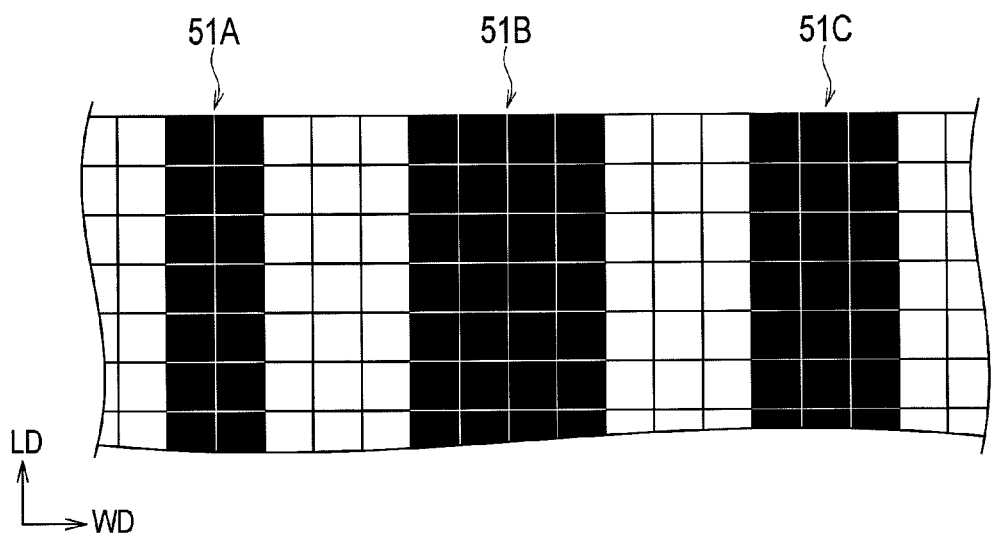
FIG. 7 is an explanatory diagram of a barcode in image data.
Figure 8:
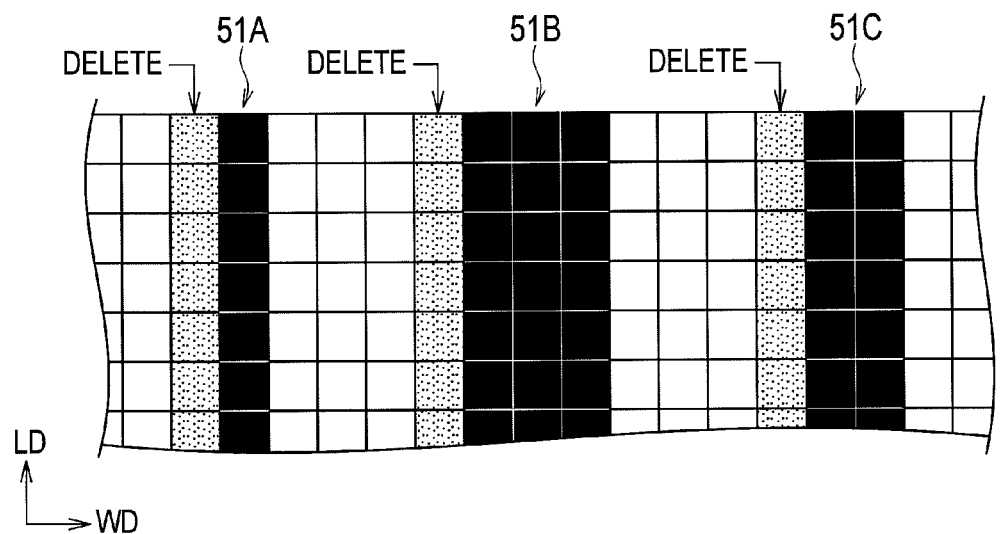
FIG. 8 is an explanatory diagram of deletion of pixels in the barcode.

To be more specific, bars 51A, 51B and 51C shown in FIG. 7, for example, are bars to form a black barcode in the image data. In FIG. 7, one cell represents one pixel. The blacked-out cells represent pixels to form bars in a barcode. As shown in FIG. 8, the controller 3 deletes pixels in one line at the left-side end of each of the bars 51A, 51B and 51C. In FIG. 8, the dot-hatched cells represent the deleted pixels. Note that, if unified within the barcode, a line of pixels to be deleted may be one at the right-side end.

Next, in Step S4, the controller 3 generates drop data of black, cyan, magenta and yellow colors based on the RGB format image data after deletion of the pixels in the bars of the black barcode. The drop data of each of the colors is data indicating the number of ink drops of each color to be ejected to the pixels.

Here, for the black barcode, the controller 3 determines the numbers of black and cyan ink drops per pixel after the pixel deletion by referring to the thinning-out printing table 41 shown in FIG. 4.

When it is determined in Step S1 described above that there is no black barcode in the image data (Step S1: NO), the controller 3 generates the drop data in Step S4 without executing Steps S2 and S3.

Also, when it is determined in Step S2 that the paper to be used for printing is not the predetermined type of paper (Step S2: NO), the controller 3 generates the drop data in Step S4 without executing Step S3.

After the drop data is generated, the controller 3 executes printing in Step S5. To be more specific, the controller 3 drives the drive roller 22 in the transfer unit 11 to rotate. Thus, the transfer belt 21 is rotated. When the paper PA is fed from the unillustrated paper feeder, the paper PA is transferred by the transfer unit 11. The controller 3 drives the inkjet heads 12K, 12C, 12M and 12Y to eject ink droplets, based on the drop data, onto the paper PA transferred by the transfer unit 11. Thus, an image is printed on the paper PA.

When there is a black barcode in the image data, thinning-out printing is performed for the barcode. Specifically, pixels in one line at one side end in the width direction (lateral direction) of each bar are deleted. At the same time, printing is performed such that the cyan ink is ejected in addition to the black ink to the remaining pixels and thus each of the bars has a specified width. Such thinning-out printing is realized by driving the inkjet heads 12 based on the drop data generated by referring to the thinning-out printing table 41 in Step S4 from the image data subjected to the pixel deletion as shown in FIG. 8 in Step S3 described above.

Figure 9:
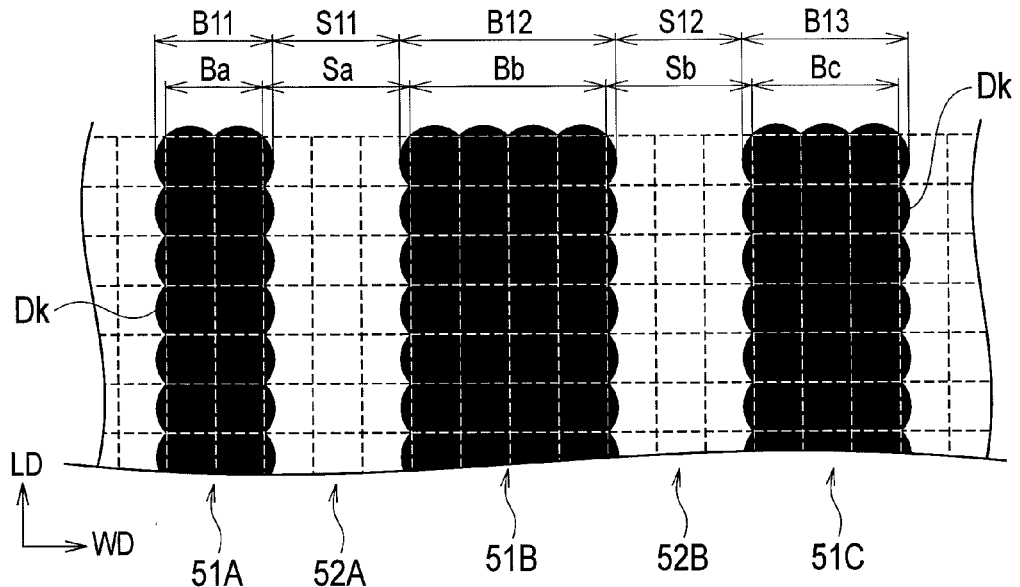
FIG. 9 is a diagram showing an example of a dot image of an image of a black barcode printed without thinning-out printing.

Here, FIG. 9 shows an example of a dot image of an image of a black barcode printed without thinning-out printing on a type of paper to be subjected to the thinning-out printing, which is different from the embodiment. FIG. 9 shows bars 51A to 51C printed based on the image data shown in FIG. 7. The bars 51A to 51C shown in FIG. 9 are formed of dots Dk of black ink.

In the example shown in FIG. 9, widths B11, B12 and B13 of the bars 51A to 51C are larger than specified widths Ba, Bb and Bc thereof due to bleeding of ink ejected to form the dots Dk. Accordingly, widths S11 and S12 of spaces 52A and 52B are smaller than specified widths Sa and Sb thereof. Here, the space 52A is a space between the bars 51A and 51B, and the space 52B is a space between the bars 51B and 51C.

Such an increase in the width of the bars as shown in FIG. 9 causes reduction in accuracy of reading the barcode. When dots are reduced in size, on the other hand, such that the bars have the specified widths, spaces are generated between the dots, leading to reduction in density of the bars. As a result, the accuracy of reading the barcode may be reduced.

Figure 10:
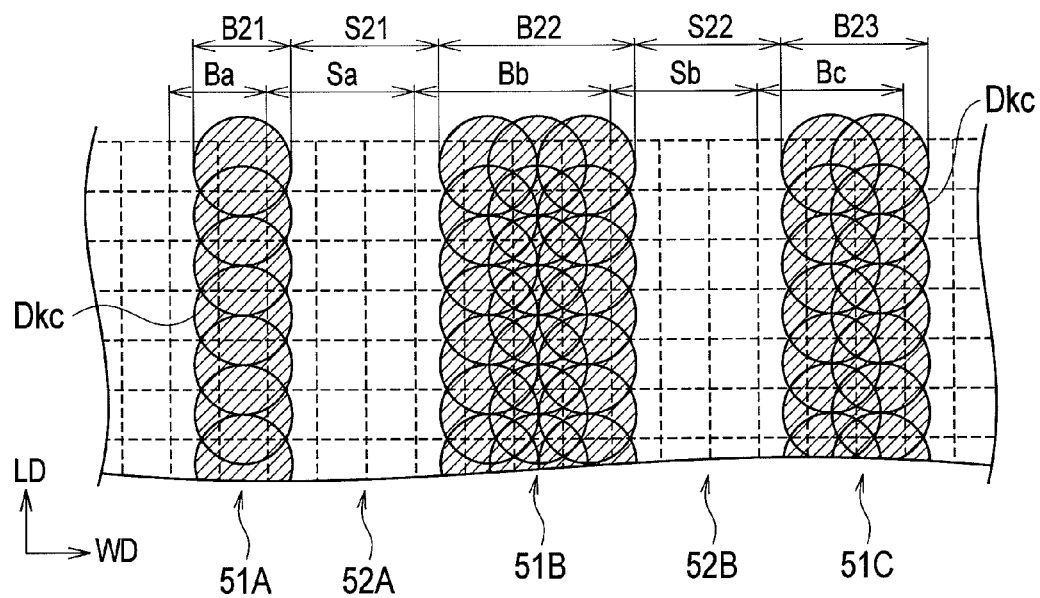
FIG. 10 is a diagram showing an example of a dot image of an image of a black barcode printed by thinning-out printing.

Therefore, the inkjet printer 1 performs the thinning-out printing described above. FIG. 10 shows an example of a dot image of an image of a black barcode printed by the thinning-out printing. FIG. 10 shows bars 51A to 51C printed with black and cyan inks based on the image data shown in FIG. 8 after the pixel deletion from FIG. 7. The bars 51A to 51C shown in FIG. 10 are formed of dots Dkc of black and cyan inks.

In the image shown in FIG. 10, although pixels in the bars 51A to 51C are deleted for one line compared with the image shown in FIG. 9, the dots Dkc are increased in size by ejecting the cyan ink in addition to the black ink to the pixels. The numbers of drops of the black and cyan inks ejected to form the dots Dkc are specified in the thinning-out printing table 41. As described above, the numbers of drops of the black and cyan inks in the thinning-out printing table 41 are set such that the bars have specified widths when each of the inks is ejected with the set number of drops per pixel in the bars after the pixel deletion.

Thus, in the example shown in FIG. 10, widths B21, B22 and B23 of the bars 51A, 51B and 510 are the same as specified widths Ba, Bb and Bc thereof. Accordingly, widths S21 and S22 of spaces 52A and 52B are also the same as specified widths Sa and Sb thereof. Thus, deterioration in accuracy of reading the barcode is reduced. Note that the addition of the cyan ink to the black ink does not cause reduction in density, which may lead to deterioration in accuracy of reading the barcode.

As described above, in the inkjet printer 1, the controller 3 deletes pixels in one line at one side end in the width direction (lateral direction) of each bar in the case of printing a black barcode in image data on a predetermined type of paper. Then, the controller 3 controls the printing unit 2 such that the cyan ink is ejected in addition to the black ink to the pixels in each bar after deletion of the pixels and thus the bar to be printed has a specified width. By deleting one line of pixels in each bar as described above, thickening of the bars printed can be suppressed. Also, an increase in the size of dots using the cyan ink in addition to the black ink covers for a part of the width reduced by the pixel deletion. Thus, the widths of the bars can be set to be the specified widths. Accordingly, the inkjet printer 1 can print the barcode so as to reduce deterioration in reading accuracy.

Moreover, in the inkjet printer 1, the controller 3 sets the number of black drops per pixel in each bar after the pixel deletion to be the maximum number of drops for the type of paper by referring to the thinning-out printing table 41. Also, the controller 3 determines the number of drops of the cyan ink to be ejected per pixel in addition to the black ink, according to the type of paper. Accordingly, the bars after the pixel deletion can be printed with the specified widths and high density without lowering the transfer speed of the paper PA according to the type of paper. Thus, the barcode can be printed so as to reduce deterioration in reading accuracy without lowering productivity of printed material.

Normally, when the number of black drops is set to be the maximum number of drops, the bars having the specified widths can be printed with cyan having the number of drops not more than the maximum number of drops. Thus, the barcode can be printed without lowering the productivity of printed material as described above. Here, depending on the type of paper, if the width of each bar does not reach the specified width even when the black and cyan inks are set to have the maximum number of drops, other kinds of inks may be used. For example, in addition to the black ink, the cyan and magenta inks may be ejected to the pixels in each bar after pixel deletion. In this case, according to the type of paper, the number of black ink drops per pixel is set to be the maximum number of drops, and the number of ink drops of another color is set to be not more than the maximum number of drops. Thus, the barcode can be printed so as to reduce deterioration in reading accuracy without lowering the productivity of printed material.

Note that, in the thinning-out printing for the barcode, clear and colorless ink may be used as the ink to be ejected in addition to the black ink. As the clear and colorless ink, there is clear ink used to improve the glossiness of a printed material, for example.

Among the clear and colorless inks such as the clear ink, there is one that improves the density of a color ink by overlapping with the color ink. When such a clear and colorless ink is used in addition to the black ink during the thinning-out printing of the barcode, the density of the bars can be improved. Thus, the accuracy of reading the barcode can be improved.

Meanwhile, when a clear and colorless ink without the function to improve the density of a color ink is ejected in addition to the black ink during the thinning-out printing of the barcode, the density of the bars may be lowered. However, deterioration in accuracy of reading the barcode can be reduced by ejecting even such a clear and colorless ink in addition to the black ink to increase the size of dots, and thereby setting the width of each bar to be the specified width.

Moreover, in the case of using the clear and colorless ink, the clear and colorless ink may be ejected not only to the pixels of the bars but also to the entire barcode area. In this case, by appropriately setting the number of drops per dot of the clear and colorless ink, the widths of the bars formed of black dots ejected to the pixels after pixel deletion can be evenly increased and thus the bars can be set to have the specified widths. Moreover, even when there is a shift in landing position between the black ink and the clear and colorless ink due to a positional shift in the nozzles between the inkjet heads ejecting the black ink and the clear and colorless ink, the bars can be set to have the specified widths.

In the above embodiment, the pixels to be deleted in the thinning-out printing are those in one line at one side end in the width direction of each bar. However, more than one line of pixels may be deleted from the end. The number of lines to be deleted may be changed according to print resolution or the type of paper, for example.

In the above embodiment, during the thinning-out printing, the cyan ink is ejected, in addition to the black ink, to the pixels in each bar after the pixel deletion. However, the cyan ink may be ejected, in addition to the black ink, only to the pixels in lines at both ends of each bar in the width direction.

Figure 11:
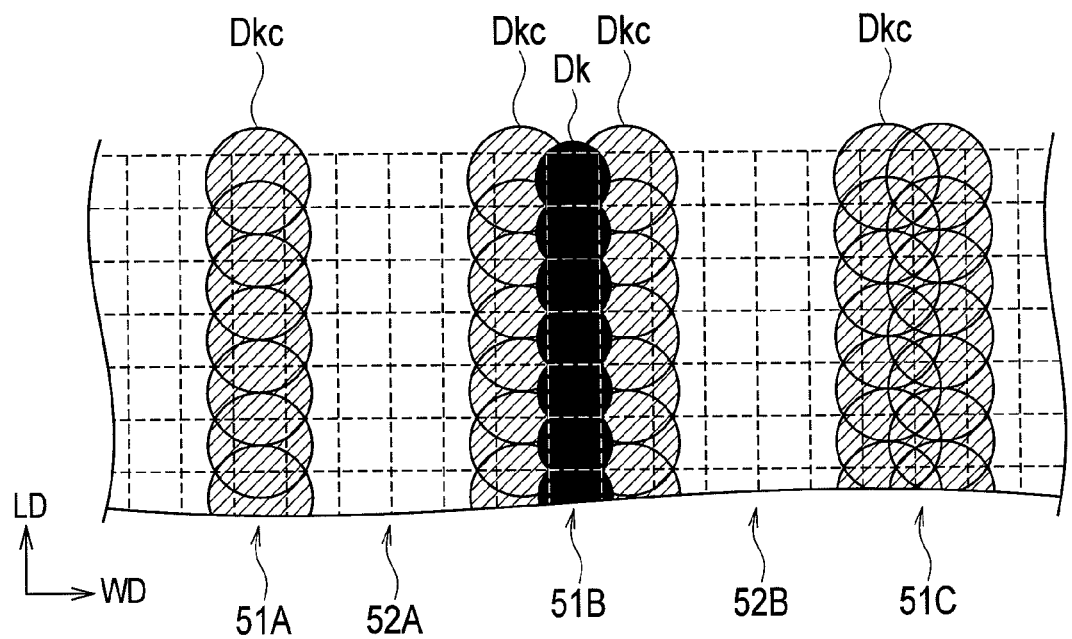
FIG. 11 is a diagram showing another example of a dot image of an image of a black barcode printed by thinning-out printing.

As shown in FIG. 11, for example, the pixels in the lines other than those at both ends of the bar 51B in the width direction may include only black dots Dk. In this way, the widths of the bars and spaces can be set to be the specified widths. Note that, also in this case, another kind of ink other than cyan may be used as the ink to be ejected in addition to the black ink.

In the above embodiment, the description is given of the case where the barcode is printed as the information code. However, the information code to be printed may be a two-dimensional code.

Figure 12:
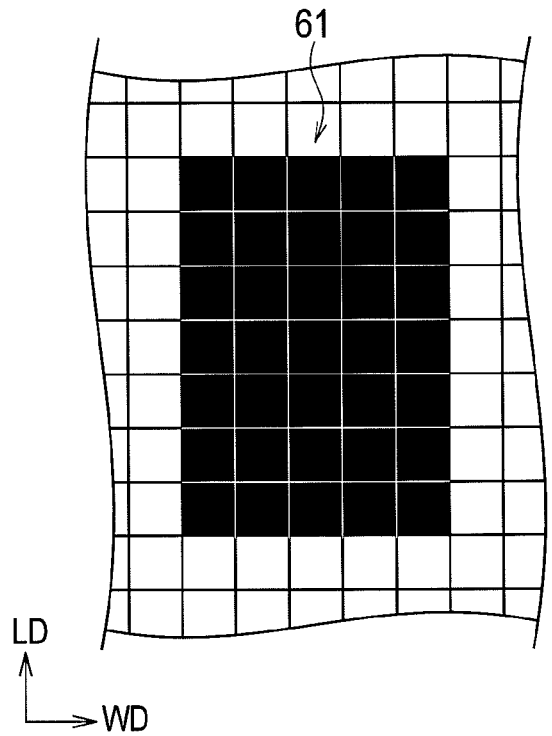
FIG. 12 is an explanatory diagram of cells that form a two-dimensional code in image data.

It is assumed, for example, that rectangular cells 61 shown in FIG. 12 are one of pattern images that form a black two-dimensional code in image data. In the two-dimensional code, information is recorded in longitudinal and lateral directions. Thus, in the two-dimensional code, the longitudinal and lateral directions correspond to the information recording direction.

Figure 13:
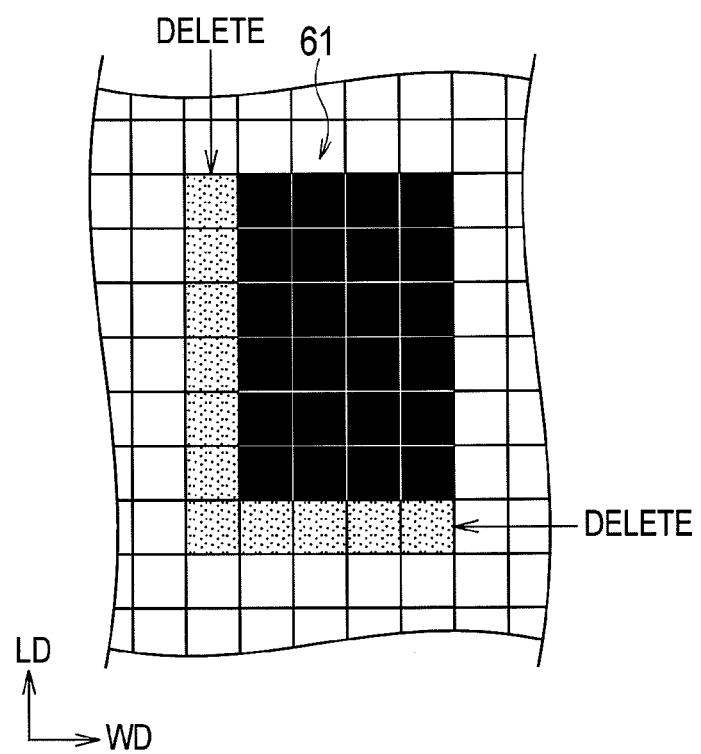
FIG. 13 is an explanatory diagram of pixel deletion in the two-dimensional code.

In the case of thinning-out printing of the two-dimensional code including the cells 61, the controller 3 deletes pixels in one line at the left-side end of the cells 61 as well as in one line at the lower-side end thereof, as shown in FIG. 13. Note that, if unified within the two-dimensional code, a line of pixels to be deleted in the lateral direction may be one at the right-side end, and a line of pixels to be deleted in the longitudinal direction may be one at the upper-side end.

Next, the controller 3 generates drop data based on image data after the pixel deletion. Here, the thinning-out printing table 41 can also be applied to thinning-out printing of the two-dimensional code. The controller 3 determines the numbers of black and cyan ink drops per pixel in the two-dimensional code after the pixel deletion by referring to the thinning-out printing table 41. Then, the controller 3 executes printing based on the generated drop data.

Figure 14:
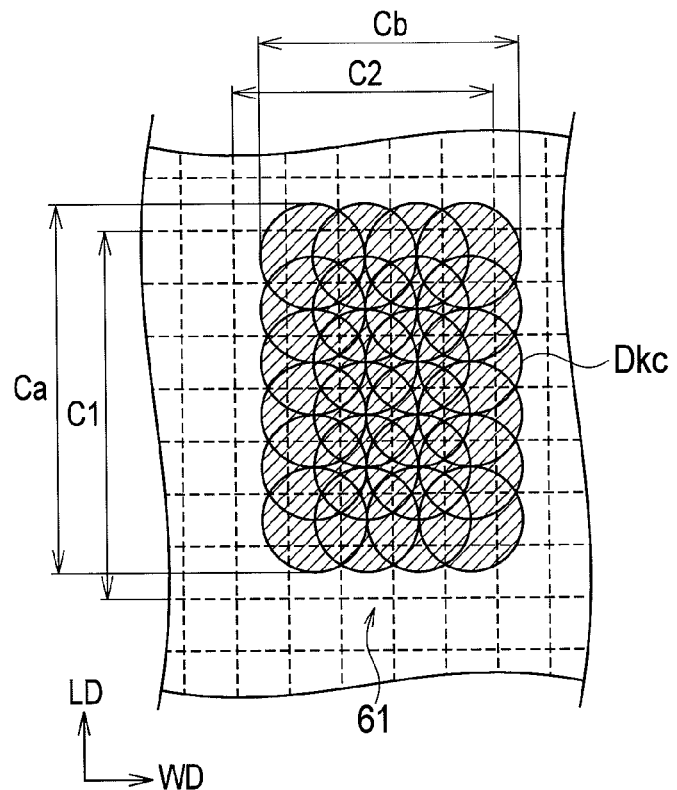
FIG. 14 is a diagram showing an example of a dot image of an image of cells in a black two-dimensional code printed by thinning-out printing.

FIG. 14 shows an example of a dot image in a part of an image of a black two-dimensional code printed by the thinning-out printing. FIG. 14 shows the cells 61 printed with black and cyan inks based on the image data shown in FIG. 13 after the pixel deletion from FIG. 12. The cells 61 shown in FIG. 14 are formed of dots Dkc of black and cyan inks.

In the example shown in FIG. 14, in the cells 61 in the two-dimensional code printed by the thinning-out printing, a width C1 in the longitudinal direction and a width C2 in the lateral direction are set the same as specified widths Ca and Cb, respectively. Thus, deterioration in accuracy of reading the two-dimensional code is reduced.

In the thinning-out printing of the two-dimensional code, as in the case of the thinning-out printing of the barcode described in the above embodiment, the number of lines of pixels to be deleted is not limited to one, but may be more than one. Specifically, more than one line of pixels may be deleted from one side end in the longitudinal direction of the cells (pattern images) and one side end in the lateral direction thereof.

Figure 15:
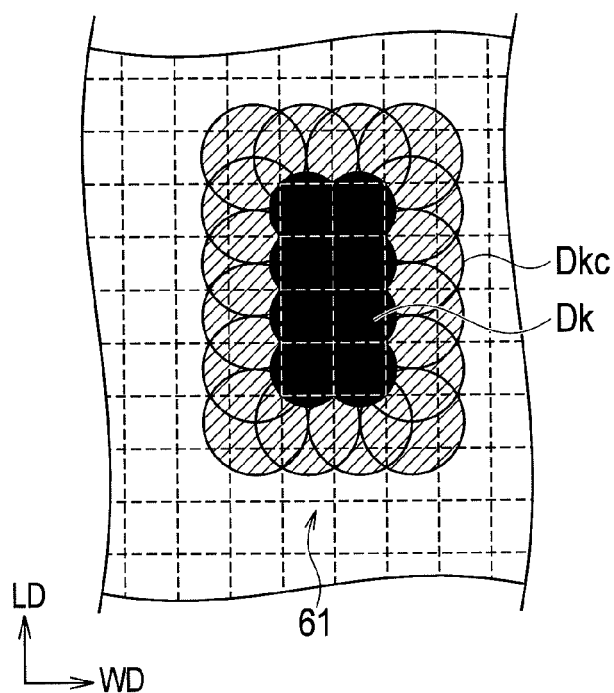
FIG. 15 is a diagram showing another example of a dot image of an image of cells in a black two-dimensional code printed by thinning-out printing.

Moreover, in the thinning-out printing of the two-dimensional code, as in the case of the thinning-out printing of the barcode described in the above embodiment, the cyan ink may be ejected, in addition to the black ink, only to the pixels in the lines at both ends in the information recording direction. As shown in FIG. 15, for example, the pixels in the lines other than those at the both ends of the cells 61 in the longitudinal and lateral directions may include only black dots Dk. In this way, the widths of the cells in the longitudinal and lateral directions and the widths between the cells can be set to be specified widths.

Also, in the thinning-out printing of the two-dimensional code, another kind of ink other than cyan may be used as the ink to be ejected in addition to the black ink.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An inkjet printer comprising:
a printing unit including a black nozzle array having a plurality of nozzles to eject an ink of black and at least one other nozzle array having a plurality of nozzles to eject an ink of color other than black, the printing unit being configured to eject the inks onto paper from the plurality of nozzles in the black nozzle array and the other nozzle array while transferring the paper; and
a controller configured to drive the printing unit to perform printing on the paper based on image data, wherein
the printing unit is capable of performing printing on a first type of paper having a first degree of ink bleed and on a second type of paper having a second degree of ink bleed smaller than the first degree of ink bleed, and
the controller is configured to
determine whether the image data includes a black information code,
upon determination that the image data includes the black information code, determine whether a paper to be printed is the first type of paper, and
upon determination that the paper to be printed is the first type of paper, delete pixels at least in one line from one side end of a pattern image forming the black information code in an information recording direction, and drive the printing unit to eject the ink of at least one color other than black in addition to the ink of black to remaining pixels at least in one line at each of two side ends in the information recording direction of the pattern image with the pixels at least in the one line being deleted such that the pattern image is printed with a same width in the information recording direction as a width of the black information code included in the image data.

2. An inkjet printer comprising:
a printing unit including a black nozzle array having a plurality of nozzles to eject an ink of black and at least one other nozzle array having a plurality of nozzles to eject an ink of color other than black, the printing unit being configured to eject the inks onto paper from the plurality of nozzles in the black nozzle array and the other nozzle array while transferring the paper; and
a controller configured to drive the printing unit to perform printing on the paper based on image data, wherein
the printing unit is capable of printing on a first type of paper having a first degree of ink bleed and on a second type of paper having a second degree of ink bleed smaller than the first degree of ink bleed, and
the controller is further configured to
determine whether the image data includes a black information code,
upon determination that the image data includes the black information code, determine whether a paper to be printed is the first type of paper,
upon determination that the paper to be printed is the first type of paper, delete pixels at least in one line from one side end of a pattern image forming the black information code in an information recording direction, and drive the printing unit to eject the ink of at least one color other than black in addition to the ink of black to remaining pixels at least in one line at each of two side ends in the information recording direction of the pattern image with the pixels at least in the one line being deleted such that the pattern image is printed with a same width in the information recording direction as a width of the black information code included in the image data, determine a maximum number of drops to be ejected per pixel from the plurality of nozzles for each type of paper to be printed, and determine a transfer speed for each type of paper based on the determined maximum number of drops, and upon printing of the black information code included in the image data on the first type of paper, set a number of drops of the ink of black per pixel in the pattern image to be the maximum number of drops, and determine a number of drops per pixel of the ink of at least the one color other than black to be ejected in addition to the ink of black from among numbers less than or equal to the maximum number of drops according to the type of the paper.

3. The inkjet printer according to claim 1, wherein the first degree of ink bleed of the first type of paper is larger than a degree of ink bleed of matte paper.

4. The inkjet printer according to claim 2, wherein the maximum number of drops is determined to be smaller as a type of paper has a larger degree of ink bleed.

5. The inkjet printer according to claim 1, wherein the ejected ink of at least one color other than black is printed in a color other than black.

6. The inkjet printer according to claim 1, wherein the ink of at least one color other than black is ejected based on the black information code.

* * * * *